United States Patent [19]

Senior

[11] 4,117,175
[45] Sep. 26, 1978

[54] PROCESS FOR RECOVERING NUTRIENTS FROM CATTLE MANURE

[75] Inventor: Franklin C. Senior, Phoenix, Ariz.

[73] Assignee: Feed Recycling Co., Ripley, Calif.

[21] Appl. No.: 339,892

[22] Filed: Mar. 9, 1973

[51] Int. Cl.² ............................................. A23J 3/00
[52] U.S. Cl. .................................. 426/657; 426/464; 426/807; 426/658; 260/122; 71/21
[58] Field of Search ............... 426/212, 374, 373, 481, 426/807, 657, 464, 658; 260/112 R, 122; 210/66, 73, 78; 71/21

[56] References Cited

U.S. PATENT DOCUMENTS

| | | | |
|---|---|---|---|
| 970,711 | 9/1910 | Hoskins | 71/21 |
| 2,204,703 | 6/1940 | Sanders | 260/112 R |
| 2,328,361 | 8/1943 | Sanders | 210/2 |
| 3,645,893 | 2/1972 | Rohrer | 210/50 |
| 3,718,504 | 2/1973 | Whittingham | 260/112 R |

Primary Examiner—Norman Yudkoff
Attorney, Agent, or Firm—George J. Netter

[57] ABSTRACT

Shredded manure is soaked in an excess of water to form a basic slurry which is then separated in a centrifugal separator. The liquid portion is added to a floc tank where a suitable flocculant precipitates proteins which upon passing through a vacuum filter is heated, producing a dry protein cake. The liquid filtrate from the vacuum filter is added to the autoclave, along with the solid material from the centrifugal separator, and the resulting slurry is acidified and raised to an elevated temperature and pressure for a prescribed time, thereby converting starches to mono-saccharides and amino sugars. The hot acidified slurry from the autoclave is discharged into a settling tank where it is acted upon by calcium oxide, removing sulphates. Subsequent filtering and evaporation of the hot slurry produces a molasses-like syrup including a significant percentage of sugars and some proteins.

3 Claims, 1 Drawing Figure

PROCESS FOR RECOVERING NUTRIENTS FROM CATTLE MANURE

BACKGROUND OF THE INVENTION

The present invention relates broadly to a process for obtaining nutrients from cattle manure, and, more particularly, to a process and system for recovering proteins and proteinaceous materials, fats, sugars and starches from cattle manure, and to convert a certain amount of the starches and celluloses therein to usable sugars.

It is conventional practice in the raising of cattle in the United States and certain other countries, to confine them in so-called feed lots or feed yards, where they are fed high-value feed mixes enriched with proteins, carbohydrates, fats, vitamins and minerals to achieve a relatively rapid gain in weight of the cattle. For example, such feed lots or feed yards may often contain as high as 2,000 to 50,000 head of cattle in a relatively small area. Hundreds of such yards exist in the United States alone and correspondingly large numbers of such lots or yards are presently in use in Japan and Europe.

Studies have shown that cattle are relatively inefficient in converting their food, and particularly the high value feed mixes, to useful meat and tissue, and, in fact, it has been shown that an average of 18 pounds (dry weight) per day of the high-value feed mixes must be fed to each animal for maintenance and to produce a daily average increase in weight of 1½ to 2¾ pounds. Moreover, the average animal voids approximately 6 pounds of dry weight per 24 hour period. From this it is clear that 30 to 40% by weight of the food value passes through the cattle and is present in its manure.

To date the manure has been merely removed periodically from the confined areas and stockpiled, pressed into blocks, and in some cases a small amount has been used on the local fields as humus, for example. Otherwise, the nutrient value in the manure has been completely lost.

In addition, the necessary removal of manure produced in the vast quantities that it is, represents a serious ecological problem. For example, estimates are that each cattle produces some 2,000 pounds in dry weight of manure on an annual basis, which amounts to some 17 to 20 million tons of dry manure in the 600 to 800 feed yards that exist in the United States. Moreover, the dairy industry in the United States by itself produces approximately 10 million tons of dry manure each year. Manure, when it is stockpiled, particularly adjacent rivers or streams, may pollute the streams and, of course, the obvious odor pollution of the atmosphere is generally offensive. Still further, flies, insects and other vermin readily propagate in manure. It is, therefore, a desideratum not only to recover whatever nutrients may be available in cattle manure, but also to eliminate the large quantities of manure that accumulate each year in a non-polluting manner.

DESCRIPTION OF A PREFERRED EMBODIMENT

Figure 1:
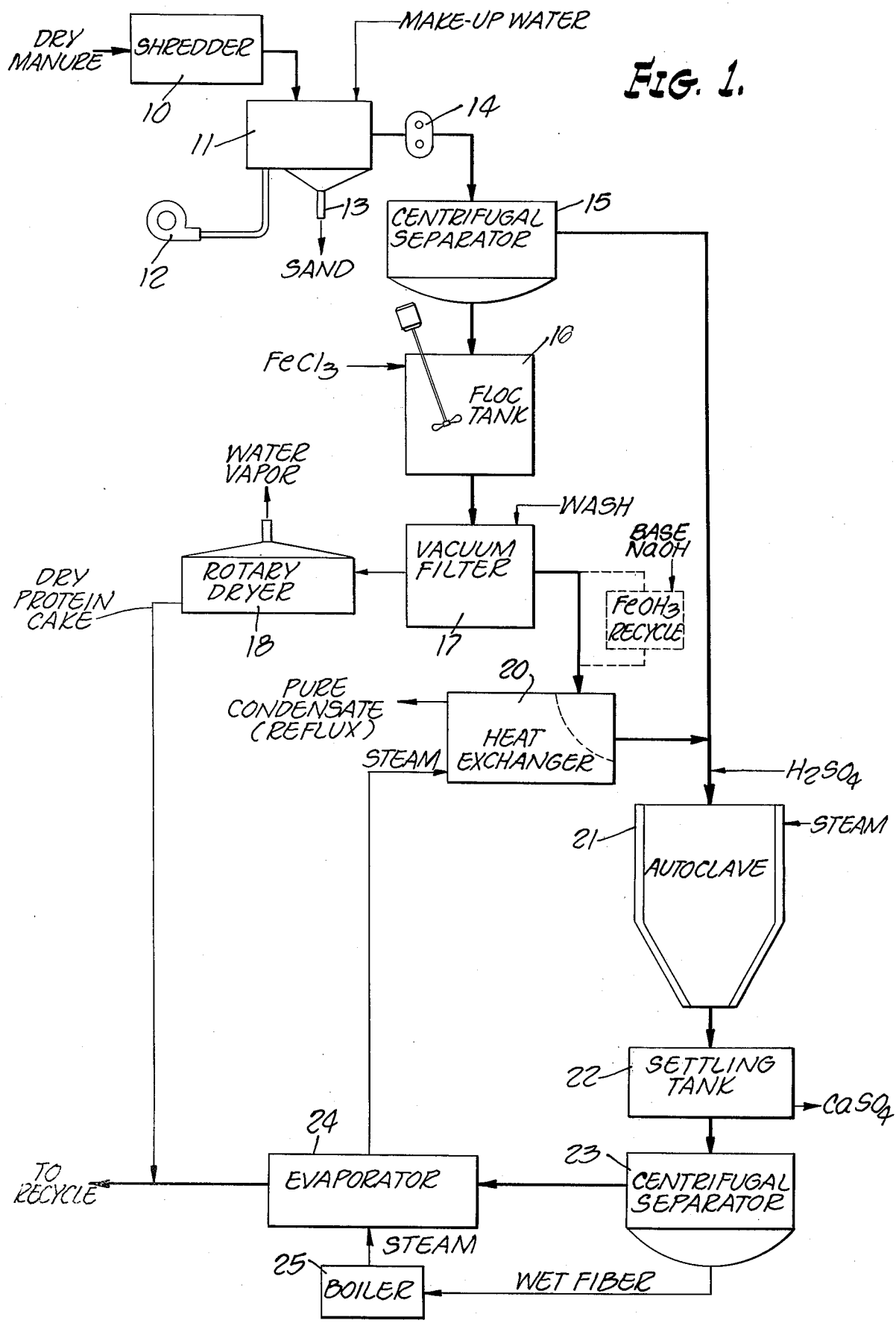
FIG. 1 of the drawings is a schematic flow diagram of the process of the present invention for extracting nutrients from the cattle manure.

Although it has been found that the constituents of cattle manure from earthen floor yards will vary from feed lot to feed lot, and actually vary somewhat on the same feed lot dependent upon the age or bacterial action during accumulation, a typical composition by weight is the following for a 1 ton (2,000 pound) dry sample:

| WEIGHT IN POUNDS | MATERIAL |
|---|---|
| 320 | proteinaceous material |
| 20 | NH$_3$, etc. |
| 80 | fats |
| 40 | sugar |
| 260 | starches |
| 610 | cellulose and cellulosic materials |
| 670 | ash, soluble and insoluble, including NaCl and KCl |

It is to be understood that the inorganic ash content of manure accumulated in slat-floored or totally confined feed lots would be substantially less than if accumulated on an earthen floor.

It is known that the amounts of protein, starch and sugar in manure is controlled by the ash content and even more significantly by the length of time bacterial action has taken place. For example, fresh manure usually contains 15–18% protein, whereas in old manure it will be down to 8–10%. The moisture content of manure has been found to vary from 5 to 60%, with the mean range being 35–40%.

As will be described herein, the process of this invention recovers proteins, proteinaceous materials, free sugars and fats; and converts a significant percentage of the remaining starches and cellulosic materials to usable sugars. It is clear that although cellulose and cellulosic structures are somewhat similar to starches, they are chemically not suitable as a foodstuff and must be converted to sugars in order to have nutrient value that is readily assimilable by cattle.

EXAMPLE

In an example of operation of the process of this invention, 1 ton (2,000 pounds) of relatively dry manure from an earthen floor feed lot, having the approximate composition by weight as set forth in the preceding table, was introduced into a vertical hammer mill 10, operating at 1,800 cycles per minute, where it was shredded to a relatively fine fiber. The shredded manure was delivered to a tank 11 where it was added to 8,000 pounds of water, the mixture being agitated in a continuous and gentle manner by air sweeping upwardly therethrough, provided by a blower 12. The fibers remained in the agitated water for a period of 4 hours, with the pH value being maintained in the range of 8.1 to 8.5. As indicated in the drawing, from a 2,000 pound sample of manure, approximately 250 pounds of sand, pebbles, clays and other insoluble and inorganic materials were separated and removed from the bottom of the tank as at 13. Although the 4 hour soak time in 11 is believed optimal for most cases, other tests have shown that for specific batches of manure, soak time may be as little as 2 hours or may require as much as 20 hours.

The importance of maintaining the pH within the prescribed range in the tank 11 is to reduce the oxidation by bacteria normally occurring in the manure which reduces the food value, and in this way undue formation of offensive odors is prevented.

The dark brown slurry weighing 9,800 pounds, comprising a mix of one part of shredded manure to four and one-half parts of water by weight, maintained at atmospheric pressure and at a temperature of 60° to 90° F, was fed by a slurry pump 14 into a rotating 40-inch diameter, perforate basket separator 15 lined with a 60 to 80 mesh stainless steel wire cloth. The separator was rotated at 1150 rpm, producing centrifugal forces of about 800 gravity to separate the slurry into two parts: an aqueous solution of approximately 7,320 pounds; and a solid or fibrous portion weighing approximately 2,480 pounds of which 1,080 pounds is dry fiber.

Instead of a centrifugal separator 15, so-called Tolhurst unit, as an alternative a vibrating, 60-mesh wire screen may be used, although with substantially reduced efficiency of separation.

The following tables show the composition of the portions separated in 15:

| AQUEOUS PORTION, pounds | FIBROUS PORTION, pounds |
|---|---|
| 160 proteins | 160 proteins |
| 20 $NH_3$ | 220 starches |
| 40 sugar | 450 cellulosic material |
| 80 fat | 250 ash |
| 70 salts | 1,400 water |
| 150 ash | |
| 200 fine fibers | |
| 6,600 water | |
| 7,320 TOTAL | 2,480 TOTAL |

The solution portion from the separator 15 is a brown mother liquor of specific gravity, which is transferred to a mixing and flocculation tank 16. A flocculation agent, ferric chloride ($FeCl_3$), is added to the tank 16 in an amount (30 pounds) equivalent to 0.25-0.4% by weight of the fluid being received from separator which maintains the pH in a range of 2.4 to 3.0.

The solution in 16 was stirred by a suitable means until a thick floc was formed with the pH maintained at approximately 2.7. The floc and liquid carrier was then delivered to a standard drum type vacuum filter unit or other solid bowl centrifugal separation device 17 operated at approximately 750 gravity, from which approximately 2,640 pounds of a brown protein gel was obtained. The gel was transferred to a rotary dryer 18 where it was heated by steam (direct firing is an excellent alternative) to a temperature of 250° F., both sterilizing the contents and as well removing a certain amount of the water. Thus, as shown in the drawing, approximately 2,100 pounds of pure water vapor are removed from the gel, leaving a 540 pound solid mass or cake of protein. Test analysis shows that use of a direct fired dryer does not affect the composition of the amino acids and proteins, and for either kiln or air dried cake the following composition was obtained;

Fats, 3%
Amino acid proteins, 28%
Free ammonia, urea, etc., 2%
Starches, 12%
Cellulose, 26%
Phosphorus, 3%
Ash (NaCl + $SiO_2$, FeO, etc.), 26%

Dried or moist cake having the above general composition is an important one for recycling, and contains valuable food products which may be directly mixed or processed into feed for cattle or, via other processing, to obtain any one or more of its constituents. The amino acid proteins form 28% of the protein cake by weight and are found to have the following composition:

| NON-ESSENTIAL AMINO ACIDS | | | |
|---|---|---|---|
| Aspartic acid | 9% | Serine | 5% |
| Glutamic acid | 16% | Proline | 5% |
| Glycine | 6% | Alanine | 11% |
| Tyrosine | 3% | TOTAL | 55% |
| ESSENTIAL AMINO ACIDS | | | |
| Lysine | 6% | Trytophan | 1% |
| Histadine | 2% | Phenyealanine | 4% |
| Leucine | 10% | Isoleucine | 5% |
| Threonine | 5% | Methionine | 2% |
| Valine | 6% | Arginine | 4% |
| | | TOTAL | 45% |

The protein stripped aqueous solution from the separator or filter 17 is a clear fluid having a specific gravity of 1.015. This solution may optionally be delivered to a further separator 19 to remove the $FeCl_3$ for reuse. This is accomplished by adding sodium hydroxide or other base adjusting the pH to 5.8-6.2 and recycling the $Fe(OH)_3$ floc with hydrochloric acid to form $FeCl_3$ for reuse.

The clear protein stripped liquid from 17 was then heated to a temperature of 60°-90° F (with the pH held to 2.8-3.0) in a heat exchanger such as a steam condenser 20, after which it can be either discarded or used as reflux brine in the process.

The fibrous materials from the centrifugal separator 15 were then added to the autoclave 21. Approximately 120 pounds of $H_2SO_4$ was added, bringing the pH of the entire mixture to less than 1.0, after which the slurry was agitated for a period of 45 to 90 minutes at a temperature of 250°-300° F. and pressure maintained between 25-75 psi. Steam provides the desired increase in temperature.

The amount of acid needed in the autoclave 21 is dependent primarily upon the ratio content of calcium, magnesium and other acid consumers originally present in the manure. Also, although hydrochloric acid (HCl) may be used instead of sulphuric acid, it is not as desirable since its use adds soluble chlorides to the system.

Fibrous materials from the separator 15, analyzed immediately prior to being added to the autoclave were found to have the following approximate composition:

| | |
|---|---|
| 160 | pounds protein, proteinaceous materials |
| 220 | pounds starch |
| 450 | pounds cellulose |
| 250 | pounds ash |
| 1,400 | pounds water |
| 2,480 | pounds total |

The protein stripped liquor from 20 contains about 2% by weight of nitrogen, sugar and salts, which assist the action of acid hydrolysis of the fibers in the autoclave. The agitation at the elevated temperature ruptures the cellulose shell of the fine fibers, exposing the starches which are converted to monosaccharides and amino sugars. Specifically, approximately 190 pounds of starch contained in the slurry was converted to 220 pounds of the various sugars, with some of the incoming proteins being partially converted to ammonium sulphate and carbohydrates by hydrolysis, leaving about 60 pounds of proteins unaffected. The autoclave converts the material to a thick, but easily filterable, slurry with a pH of 1.3-1.5 and at a temperature of approximately 240° F., which is discharged into a settling tank 22. This hot slurry, weighing approximately 7,280 pounds was mixed with 50 pounds of calcium oxide (CaO), changing the pH to 4.8-6.0, such that calcium sulphate (gypsum) settles out. Specifically, 150 pounds of gypsum were removed from the settling tank 22. It is contemplated that other means for separating gypsum could be used, such as riffles, special launders, or centrifugal devices.

The hot slurry from the tank 22 was delivered to a centrifugal separator 23 operating at 300 gravity and having 60 to 80 mesh wire cloth, where a low viscosity solution weighing approximately 5,730 pounds was produced for delivery to a multiple effect evaporator unit 24. This hot, thin juice had a specific gravity of 1.038 and the approximate following composition by weight:

Protein, 1.4%
Ammonium sulphate, 1.0%
Total invert sugar, 4.4%
Salts (NaCl, etc.), 4.0%
Water, Balance In the evaporator unit 24 approximately 4,600 pounds of water was removed as steam, which was delivered to the heat exchanger 20 where on condensing it heated the incoming filtrate stream and the 4,600 pounds of pure condensate (reflux) delivered back to tank 11.

The final product from the evaporator 24 was a thick brown, molasses-like, syrup weighing approximately 1,130 pounds and having a specific gravity of 1.24, or 10.5–11.0 pounds per gallon, with the following composition:

Sugars, 22%
Ammonium sulphate, 5%
Proteins, 7%
Salts (Na and K), 8%
Other ash, 2%
Water, Balance It is to be particularly noted that 670 pounds of starch, cellulose and carbohydrates have been converted to 220 pounds of various sugars, which amounts to better than 30% conversion of the carbohydrates to sugars, and over 80% for the starches.

Recapitulating on the overall operation, from a 1 ton (2,000 pounds) initial sample of dry feed lot cattle manure, the following food values in usable form have been obtained:

|  | In 540 pounds Dry Protein Cake | In 1,130 pounds Thick Syrup | Total Pounds |
|---|---|---|---|
| Crude proteins | 160 | 80 | 240 |
| Other nitrogenous salts | 10 | 60 | 70 |
| Fats, fatty acids | 30 | 10 | 40 |
| Starches | 70 | — | 70 |
| Sugars | — | 250 | 250 |
| Salts (sodium and Potassium) | 20 | 110 | 130 |
| Phosphorus | 15 | — | 15 |

This amounts of recycling of approximately 75% of the total protein in the fresh manure, approximately 50% of the fats, and the production of about 250 pounds of sugars per ton of manure.

Examplary of recycling use of the materials produced through practice of this invention as animal feed, the 540 pounds of protein cake and 1,130 pounds of proteinaceous molasses was mixed with 14,000 pounds of a typical feed mix of barley, milo, fats, oats, alfalfa and vitamin-mineral premix. The resultant mix was fed to cattle in several different feed lots with excellent results obtained. The recycle food values obtained by this invention could also be used, or readily adapted for use, as a foodstuff for other domestic animals, or, not inconceivably for man himself.

In addition, the final fibrous material received from the unit 23, having a combined weight of approximately 1,400 pounds wet and 680 pounds dry, were found to include approximately 25% by weight of nitrogenous substances, such as ammonium sulphate, ammonia and proteins, substantially all the cellulosic fibers and hair, and 120 pounds of inorganic ash. These fibers have a variety of other and non-nutritional uses, such as, for example, wallboard, tile filters, making charcoal, soil conditioners, roughage in feed, or as a fuel.

Also, the fibers from 23, after drying by the boiler waste gases, can be burned in the boiler as a supplemental fuel. In this case, the 680 pounds of dry fiber carry approximately 560 pounds of combustible organic materials with a fuel value of slightly more than 7,000 BTU/lb. or 4,000,000 BTU's per ton of manure. Thus, this material used as a fuel in the described system would be enough to provide the heat requirements for the autoclave and multiple effect evaporators.

What is claimed is:

1. A process for making a nutritious additive for cattle feed from cattle manure or cattle manure obtained from feed lots, which comprises:
   shredding the manure;
   mixing the shredded manure with water to form an aqueous slurry;
   basifying the slurry;
   centrifugally separating the liquid and solid portions of the slurry;
   subjecting said liquid portion to the action of a chloride for precipitating protein constituents;
   separating the precipitated protein constituents from the liquid carrier;
   dehydrating the protein constituents to form a portion of the cattle feed additive;
   acidifying the slurry solid portion to a pH below about 1.0;
   increasing the temperature of the acid treated slurry to above 250° F. while maintaining the pressure thereof in the range of 25–75 psi;
   agitating the heated pressurized slurry to rupture the solid portion and expose starches for conversion to mono-saccharides and amino sugars;
   subjecting the hot slurry to the action of calcium oxide; and
   condensing the hot slurry to form a syrup including sugars and proteins which is a further portion of the cattle feed additive.

2. A process for making a nutritious additive for cattle feed from cattle manure or feed lot cattle manure, which comprises:
   Forming a slurry of the manure in an excess of water;
   basifying the slurry;
   centrifugally separating the liquid and solid portions of the slurry;
   subjecting said liquid portion to the action of $FeCl_3$ to flocculate proteins;
   centrifugally separating flocculated proteins from the liquid carrier to form a first portion of the cattle feed additive;
   acidifying the slurry solid portion with $H_2SO_4$;
   increasing the temperature of the acid treated slurry to above 250° F. while maintaining the pressure thereof in the range of 25–75 psi;
   agitating the heated pressurized slurry to rupture the solid portion thereof;
   treating the hot slurry with calcium oxide; and condensing the hot slurry to form a syrup including sugars and amino-saccharides which is a further portion of the cattle feed additive.

3. A process for recovering nutrients from cattle manure and cattle manure from feed lots, which comprises:

shredding the manure;

mixing the shredded manure with water while maintaining the pH value between 8.1 and 8.5;

passing air through the manure-water mixture for effecting thorough mixture thereof;

centrifugally separating the liquid and solid portions of the manure-water mixture;

precipitating protein constituents from said liquid portion;

centrifugally separating protein containing gelatinous material from the liquid portion;

raising the temperature of the precipitated gelatinous material to above about 250° F. to form a sterilized dry mass of protein containing material; and basifying the protein stripped liquid portion to a pH range of 5.8 to 6.2 for refluxing in the process.

* * * * *